United States Patent
Li et al.

(10) Patent No.: US 7,936,703 B2
(45) Date of Patent: May 3, 2011

(54) OPTIMIZED CACHE CONSISTENCY ALGORITHM IN A POINT-TO-POINT INTERCONNECTED MULTIPLE PROCESSOR SYSTEM

(75) Inventors: Yufu Li, Shanghai (CN); Xiaohua Cai, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 11/995,047

(22) PCT Filed: Sep. 20, 2006

(86) PCT No.: PCT/CN2006/002465
§ 371 (c)(1),
(2), (4) Date: Jan. 8, 2008

(87) PCT Pub. No.: WO2008/034298
PCT Pub. Date: Mar. 27, 2008

(65) Prior Publication Data
US 2010/0110934 A1    May 6, 2010

(51) Int. Cl.
*H04L 12/28* (2006.01)

(52) U.S. Cl. ........................ 370/256; 370/238

(58) Field of Classification Search ............ 370/252, 370/254–256
See application file for complete search history.

(56) References Cited

U.S. PATENT DOCUMENTS

| | | | |
|---|---|---|---|
| 5,781,757 A | 7/1998 | Deshpande | |
| 6,915,340 B2 * | 7/2005 | Tanaka | 709/220 |
| 2002/0146008 A1 * | 10/2002 | Kaplan | 370/390 |
| 2006/0109801 A1 * | 5/2006 | Ashwood | 370/256 |
| 2006/0280131 A1 * | 12/2006 | Rahman et al. | 370/256 |

FOREIGN PATENT DOCUMENTS

CN    1161119    10/1997

* cited by examiner

*Primary Examiner* — Ricky Ngo
*Assistant Examiner* — Kan Yuen
(74) *Attorney, Agent, or Firm* — Blakely, Sokoloff, Taylor & Zafman LLP (57) ABSTRACT

A spanning tree is assigned to a processing node for each processing node in a point-to-point network that connects a plurality of processing nodes. The spanning tree uses the processing nodes as vertices and links of the network as edges. Each processing node includes input snoop ports that can be configured as either terminating or forwarding. According to the assigned spanning trees and the configuration of the input snoop ports, the network routes snoop messages efficiently and without conflicts.

14 Claims, 8 Drawing Sheets

OPTIMIZED CACHE CONSISTENCY ALGORITHM IN A POINT-TO-POINT INTERCONNECTED MULTIPLE PROCESSOR SYSTEM

BACKGROUND

1. Field

Cache coherency in a point-to-point interconnected multi-processor system.

2. Background

Processors in a multi-processor (MP) system may be connected with a multi-drop bus or a point-to-point interconnection network. A point-to-point interconnection network may provide full connectivity in which every processor is directly connected to every other processor in the system. A point-to-point interconnection network may alternatively provide partial connectivity in which a processor reaches another processor by routing through one or more intermediate processors.

Each processor in a MP system typically has a local cache to store data and code most likely to be reused. To ensure cache coherency, processors need to be informed of any transactions that may alter the coherency states of the data items in their local caches. One approach to cache coherency is directory-based where a centralized directory keeps track of all memory transactions that may alter the coherency states of the cached items. A coherency state indicates whether a data item is modified by a processor (the "M" state), exclusively owned by a processor (the "E" state), shared by multiple processors (the "S" state), or invalidated (the "I" state). The implementation of a directory often incurs substantial hardware cost.

Another approach to cache coherency is based on message exchanges among processors. For example, processors may exchange snoop messages to notify other processors of memory transactions that may alter the coherency states of cached data items. In a bus-connected MP system when a processor fetches a data item from main memory, all of the other processors can snoop the common bus at the sane time. In a point-to-point interconnection network, a processor sends snoop messages to all the other processors when it conducts a memory transaction. Snoop messages can be sent directly from one processor to all the other processors in a fully-connected point-to-point interconnection network. However, to save hardware cost, a typical point-to-point interconnection network often provides partially connectivity which does not provide direct links between all processors.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
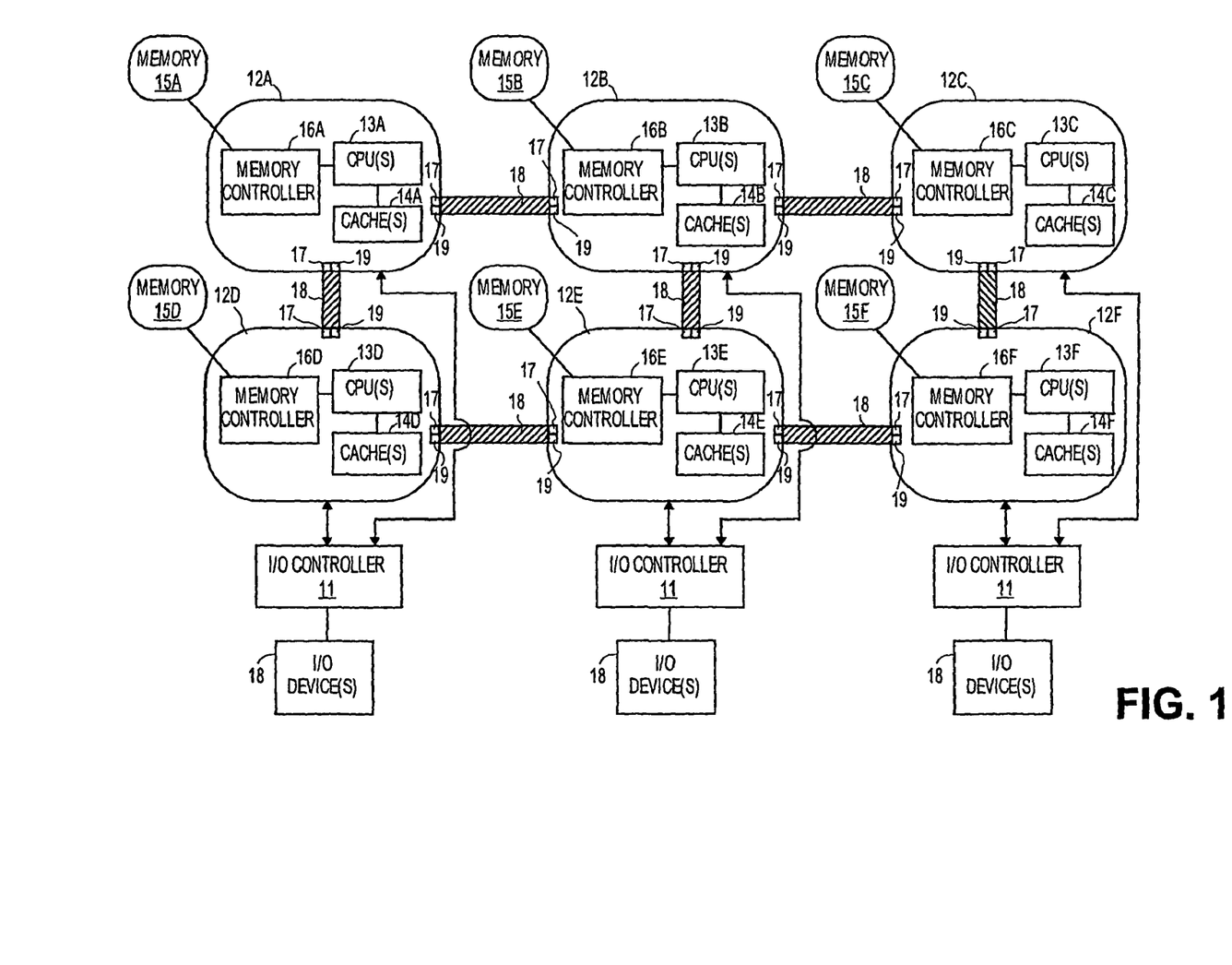
FIG. 1 shows an embodiment of a multi-processor system comprising a plurality of processing nodes interconnected by a point-to-point network.

Referring to FIG. 1, an embodiment of a multi-processor system 10 comprises a plurality of processing nodes 12A-12F interconnected by a point-to-point network 18 (indicated by thick lines having an oblique pattern between the processing nodes). Each processing node 12A-12F includes one or more central processing units (CPUs) 13A-13F and one or more local caches 14A-14F. Each processing node 12A-12F is coupled to an associated memory 15A-15F which constitutes main memory of system 10. In alternative embodiments, memory 15A-15F may be physically combined to form a main memory that is accessible by all of processing nodes 12A-12F. Each processing node 12A-12F also includes a memory controller 16A-16F to interface with memory 15A-15F. Each processing node 12A-12F including its associated memory controller 16A-16F may be implemented on the same chip. In alternative embodiments, each memory controller 16A-16F may be implemented on a chip separate from its associated processing node 12A-12F.

Each memory 15A-15F comprises one or more types of memory devices such as, for example, dual in-line memory modules (DIMMs), dynamic random access memory (DRAM) devices, synchronous dynamic random access memory (SDRAM) devices, double data rate (DDR) SDRAM devices, or other volatile or non-volatile memory devices suitable for server or general applications.

System 10 also includes one or more input/output (I/O) controllers 11 to provide an interface for processing nodes 12A-12F and other components of system 10 to access to I/O devices 18. In the embodiment as shown, each I/O controller 11 is coupled to two processing nodes. The links between I/O controllers 11 and their respective processing nodes 12A-12F are referred to as I/O links. In alternative embodiments, each I/O controller 11 is be coupled to one, two, or more processing nodes 12A-12F. I/O devices 18 includes Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications. I/O devices 18 may be wire-lined or wireless. In one embodiment, I/O devices 18 may include a wireless transmitter and a wireless transmitter receiver.

System 10 may be a server, a multi-processor desktop computing device, an embedded system, a network device, or a distributed computing device where the processing nodes are remotely connected via a wide-area network.

In the embodiment as shown, network 18 provides partial connectivity for processing nodes 12A-12F. Thus, every processing node 12A-12F is directly connected to some, but not all, of the other processing nodes. A processing node 12A-12F is connected to another processing node via a direct link (e.g., between processing nodes 12A and 12B) or via an indirect connection (e.g., between processing nodes 12A and 12C).

A type of message carried by network 18 is a snoop message, which contains information about a memory transaction that may affect the coherency state of a data item in caches 14A-14F. A memory transaction refers to a transaction that requires access to any memory device 15A-15F or any cache 14A-14F. When any processing node performs a memory transaction, the processing node issues a snoop message (or equivalently, snoop request) on network 18 to request all of the other processing nodes to verify or update the coherency states of the data items in their respective local caches. I/O controllers 11 also issues and receives snoop messages when performing a direct memory access (DMA). Thus, any of processing nodes 12A-12F and I/O controllers 11 may be a requesting node for a snoop message and a destination node for another snoop message.

When a processing node (e.g., 12A) sends a snoop message to another processing node (e.g., 12C) which is not directly connected to processing node 12A, processing nodes 12A uses another processing node (e.g., 12B) as a forwarding node. In this scenario, processing node 12B serves as a forwarding node that forwards the snoop message to both processing nodes 12C and 12E. The forwarding is performed by a fan-out mechanism in processing node 12B which replicates the incoming snoop message and forwards the replicated messages to different destinations. For example, processing node 12B may receive a snoop message from processing node 12A, produces two copies of the snoop message, and forward the two copies to processing nodes 12C and 12E at substantially the same time. I/O controllers 11 do not forward snoop messages and therefore do not have the fan-out mechanism.

In one embodiment, the fan-out mechanism is implemented in snoop ports of each processing node 12A-12F. Each processing node 12A-12F includes a separate snoop port for each direct link of network 18. Each snoop port includes an input snoop port 19 for receiving snoop messages and an output snoop port 17 for transmitting snoop messages. Each input snoop port 19 includes configurable hardware which may be configured as either terminating or forwarding. An input snoop port 19 is configured as terminating if the processing node in which the input snoop port resides is a terminating node for the snoop messages received from the input snoop port. A terminating node means the node is a destination for the snoop message and no forwarding of the snoop message is necessary. An input snoop port 19 is configured as forwarding if the processing node in which the input snoop port resides is a forwarding node for the snoop messages received from the input snoop port. Input snoop port 19 is configured following a reconfiguration event. A reconfiguration event may include, but is not limited to, CPU hot plug, link disable or enable during runtime, system reboot, or any event that may change the topology of network 18. The configurations of input snoop port 19 remain the same until the next reconfiguration event.

Figure 2:
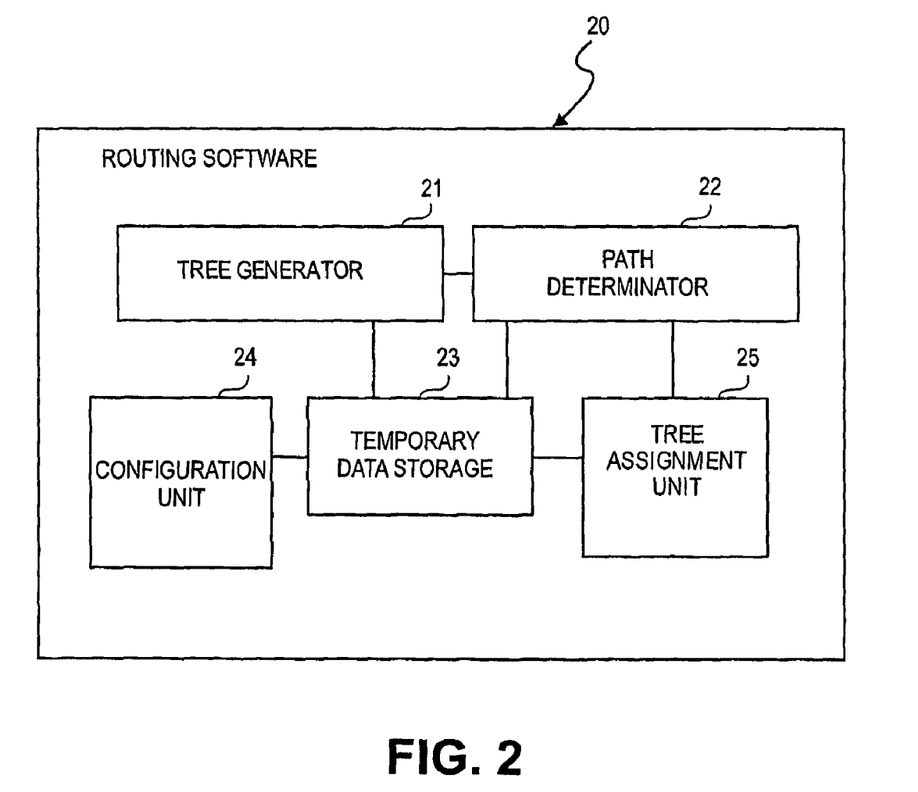
FIG. 2 shows an embodiment of routing software that generates routes for snoop messages issued by the processing nodes of FIG. 1.

Referring to FIG. 2, in one embodiment, system 10 uses routing software 20 to ensure that snoop messages are transmitted correctly, efficiently, and conflict-free. Routing software 20 includes a tree generator 21, a tree assigning unit 22, temporary data storage 23, a configuration unit 24, and a path determinator 25, the functions of all of which will be described in detailed later. It is to be understood the interconnections among tree generator 21, tree assigning unit 22, temporary data storage 23, configuration unit 24, and path determinator 25 as shown are for illustration purposes only and may vary in alternative embodiments.

Routing software 20 includes tree generator 21 to generate spanning trees and tree assignment unit 22 to assign a spanning tree to each processing node 12A-12F. A tree is defined as an undirected graph that does not contain circles. A spanning tree is defined as a tree that connects every vertex (e.g., processing nodes 12A-12F and I/O controllers 11) in the system. Each spanning tree uses all of processing nodes 12A-12F and I/O controllers 11 as its vertices and some or all of network 18 links and I/O links as its edges. I/O controllers 11 serve as the leaves of the tree and cannot be the root of the tree. The spanning trees assigned to processing nodes 12A-12F may be all the same, all different, or some the same and some different.

System 10 executes routing software 20 after a reconfiguration event to determine the route of a snoop message between any requesting node and any given destination node. Once determined, the route between the two nodes remains the same until the next reconfiguration event. Following a reconfiguration event, one processing node (e.g., 12A) is designated as a bootstrap processor that loads routing software 20 into its associated memory (e.g., 15A). The bootstrap processor executes routing software 20 to determine message routes and to configure all of input snoop ports 19.

Routing software 20 includes tree generator 21 to generating spanning trees and tree assignment unit 22 to assigned a spanning tree to each processing node 12A-12F. A tree is defined as an undirected graph that does not contain circles. A spanning tree is defined as a tree that connects every vertex (e.g., processing nodes 12A-12F and I/O controllers 11) in the system. Each spanning tree uses all of processing nodes 12A-12F and I/O controllers 11 as its vertices and some or all of network 18 links and I/O links as its edges. I/O controllers 11 serve as the leaves of the tree and cannot be the root of the tree. The spanning trees assigned to processing nodes 12A-12F may be all the same, all different, or some the same and some different.

Figure 3:
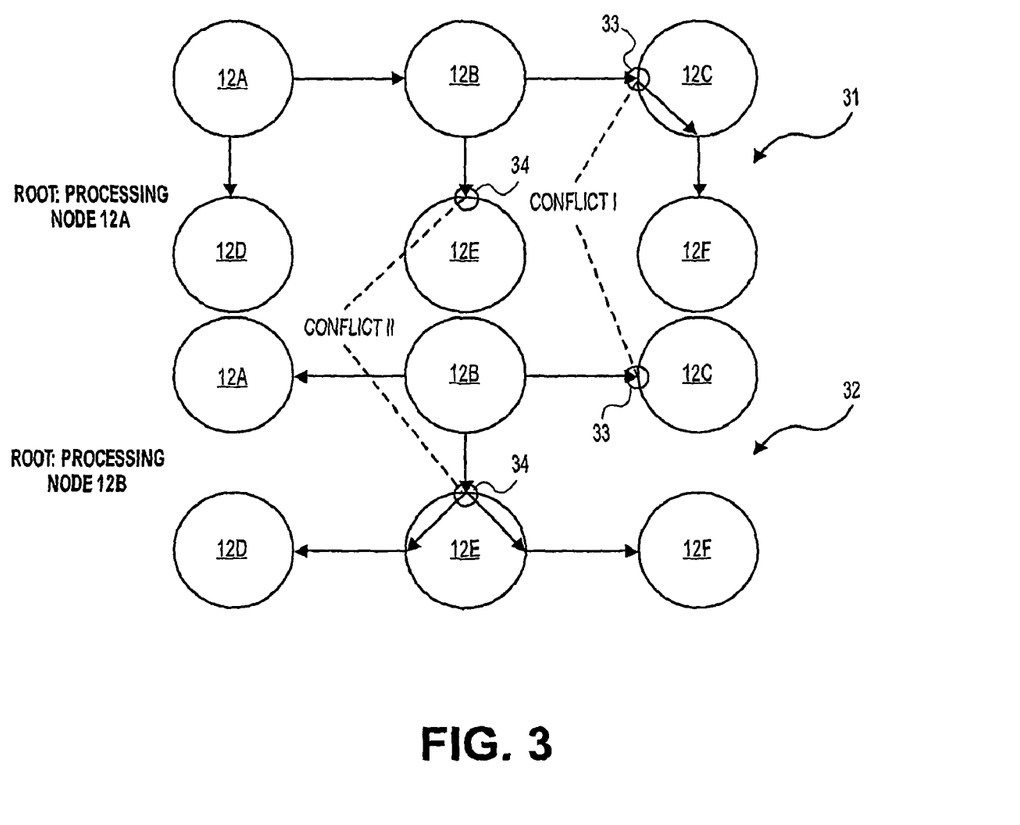
FIG. 3 shows examples of conflicts that occur in two spanning trees, each tree using a different processing node as the root.

FIG. 3 shows examples of a spanning tree 31 having processing node 12A as the root (that is, the requesting processing node that issues a snoop message). Another example of a spanning tree 32 is shown that has processing node 12C as the root. For example, processing node 12A may transmit a snoop message to processing nodes 12B-12F along the edges of spanning tree 31. As a tree contains no circles, the tree structure ensures that the snoop message is received only once by any of processing nodes 12B-12F.

For simplicity of the illustration, I/O controllers 11 are not shown as part of spanning trees 31, 32, and any of the trees described below. However, it is understood that each I/O controller 11 is connected to an assigned spanning tree as a leaf of the tree. Being a leaf of a tree means that each I/O controller 11 receives a snoop message from one of the processing nodes connected thereto and may not receive the same snoop message from more than one processing node. It is also understood that when one of the I/O controllers 11 issues a snoop message, the I/O controller may send the snoop message to a processing node connected thereto. The processing node then uses the assigned spanning tree to transmit the snoop message to all of the other nodes (excluding the I/O controller that issues the snoop message) in the assigned spanning tree.

The spanning trees assigned to each processing node 12A-12F may be optimized for efficiency. For example, the spanning tree may be a minimal spanning tree. A minimal spanning tree is a spanning tree that weights less than or equal to all other spanning trees having the same vertices. The weight of a tree is calculated by adding the weights of all of its edges. In one scenario, a weight of a tree edge corresponds to the path length, delay, and/or speed of the network link that forms the edge. Transmitting snoop messages along a minimal spanning tree may increase the transmission speed and efficiency.

A spanning tree assigned to a processing node 12A-12F may be optimized for the processing node. For example, a spanning tree may provide the shortest path between a requesting processing node (that is, the node to which the tree is assigned) and each of its destinations. Algorithms for calculating the shortest path is known in the art (e.g., Dijkstra's algorithm, Bellman-Ford algorithm) The spanning tree that provides the shortest path may not be unique. That is, there may be a plurality of spanning trees for a processing node 12A-12F that provides the shortest path between the processing node and each of its destinations. In an embodiment where all of the network links between processing nodes have substantially the same weight, a shortest path is a path that has the smallest number of network links. As each spanning tree is optimized for its respective processing node 12A-12F, snoop messages can be delivered efficiently no matter which processing node is sourcing the messages.

However, some of the spanning trees, when used together, may produce conflicts in input snoop ports 19 (FIG. 1). A conflict occurs when different snoop messages arriving at the same input snoop port 19 calls for different configurations of the port. For example, a snoop message arriving at an input snoop port 19 may need to be forwarded and another snoop message arriving at the same port may not need to be forwarded. Input snoop port 19 would be configured as forwarding for the snoop message that needs to be forwarded, and would be configured as terminating for the snoop message that does not need to be forwarded. However, input snoop port 19 can have only one of the two configurations. The configuration stays the same until the next reconfiguration and cannot be dynamically adjusted during message transmissions between reconfiguration events.

FIG. 3 shows an example of conflicts between two spanning trees 31 and 32 that are optimized for processing nodes 12A and 12B. In the example of Conflict I, spanning tree 31 uses a fan-out mechanism 33 in the input snoop port of processing node 12C to forward the snoop message originating from processing node 12A to processing node 12F. However, spanning tree 32 uses the same input snoop port as a terminating port as the snoop message originating from processing node 12B has reached its destination (processing node 12C). As mentioned above, an input snoop port can be configured as either forwarding or terminating, but not both. Thus, a conflict in the configuration setting for the input snoop port occurs if spanning trees 31 and 32 are used together for processing nodes 12A and 12B.

In the example of Conflict II, spanning tree 32 uses fan out mechanism 34 in the input snoop port of processing node 12E to forward the snoop message originating from processing node 12B to processing nodes 12D and 12F. However, spanning tree 31 uses the same input snoop port as a terminating port as the snoop message originating from processing node 12A has reached its destination (processing node 12E). As mentioned above, an input snoop port can be configured as either forwarding or terminating, but not both. Thus, a conflict in the configuration setting for the input snoop port occurs if spanning trees 31 and 32 are used together for processing nodes 12A and 12B.

To ensure that snoop messages are transmitted without a conflict, routing software 20 of FIG. 2 uses the same spanning tree for more than one processing nodes 12A-12F. Generally, conflicts can be eliminated if the same tree is used for all processing nodes 12A-12F. For example, processing nodes 12A and 12B in FIG. 3 use the same spanning tree 31 for sending snoop messages without causing any conflicts in any of input snoop ports. However, spanning tree 31 is not optimized for every processing node 12A-12F. For example, sending a snoop message from processing node 12D to processing node 12E using spanning tree 31 takes three hops. Sending the message between the same processing nodes using spanning tree 32 takes only one hop. Thus, routing software 20 may selectively reuse some of the spanning trees, or some parts of the trees, to ensure conflict-free as well as efficient transmissions.

Figure 6A:
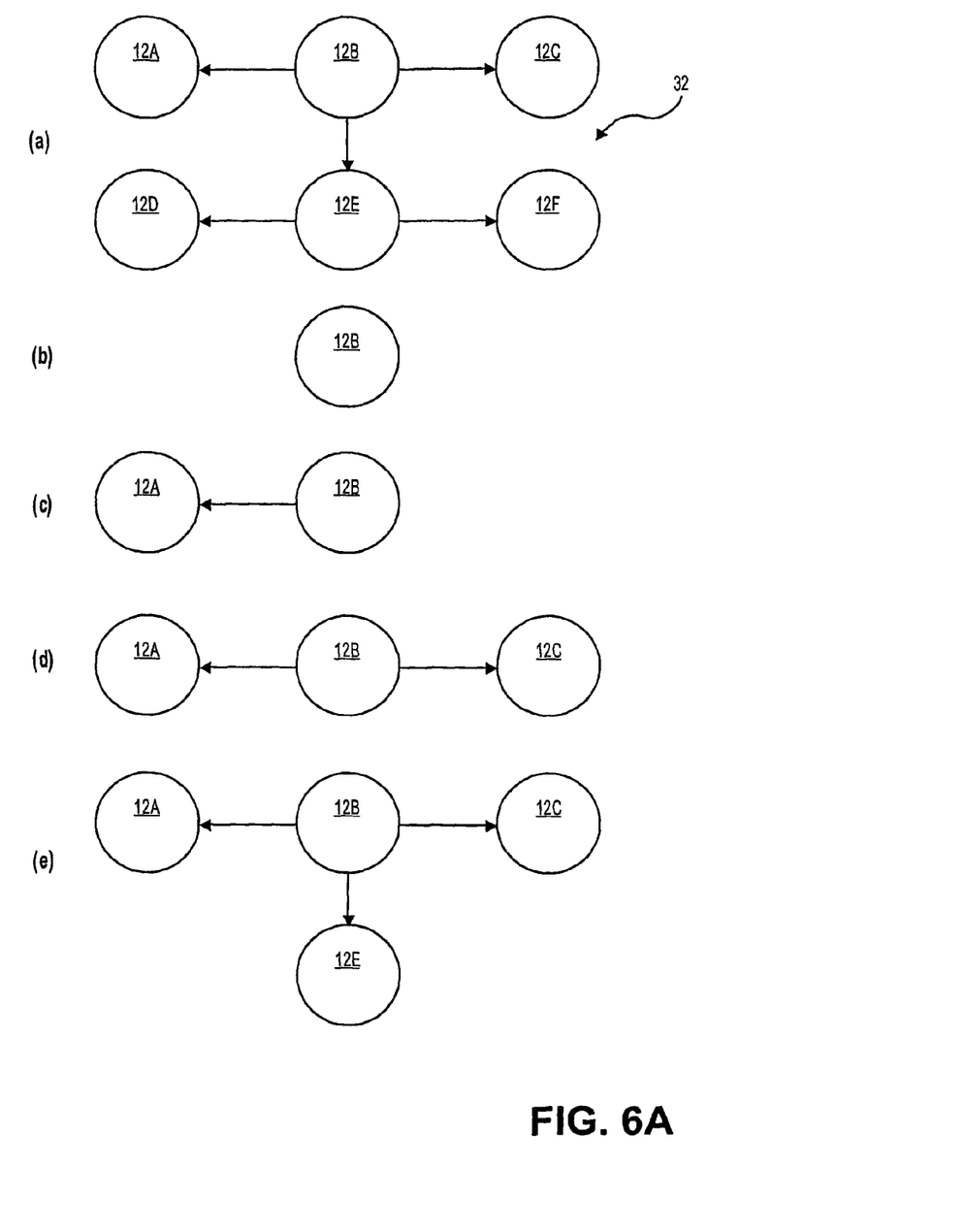
FIG. 6A and FIG. 6B show an example of a process performed by the routing software of FIG. 2 to determine whether a previously-generated spanning tree or a part of the tree can be reused by a subsequent processing node.
Figure 6B:
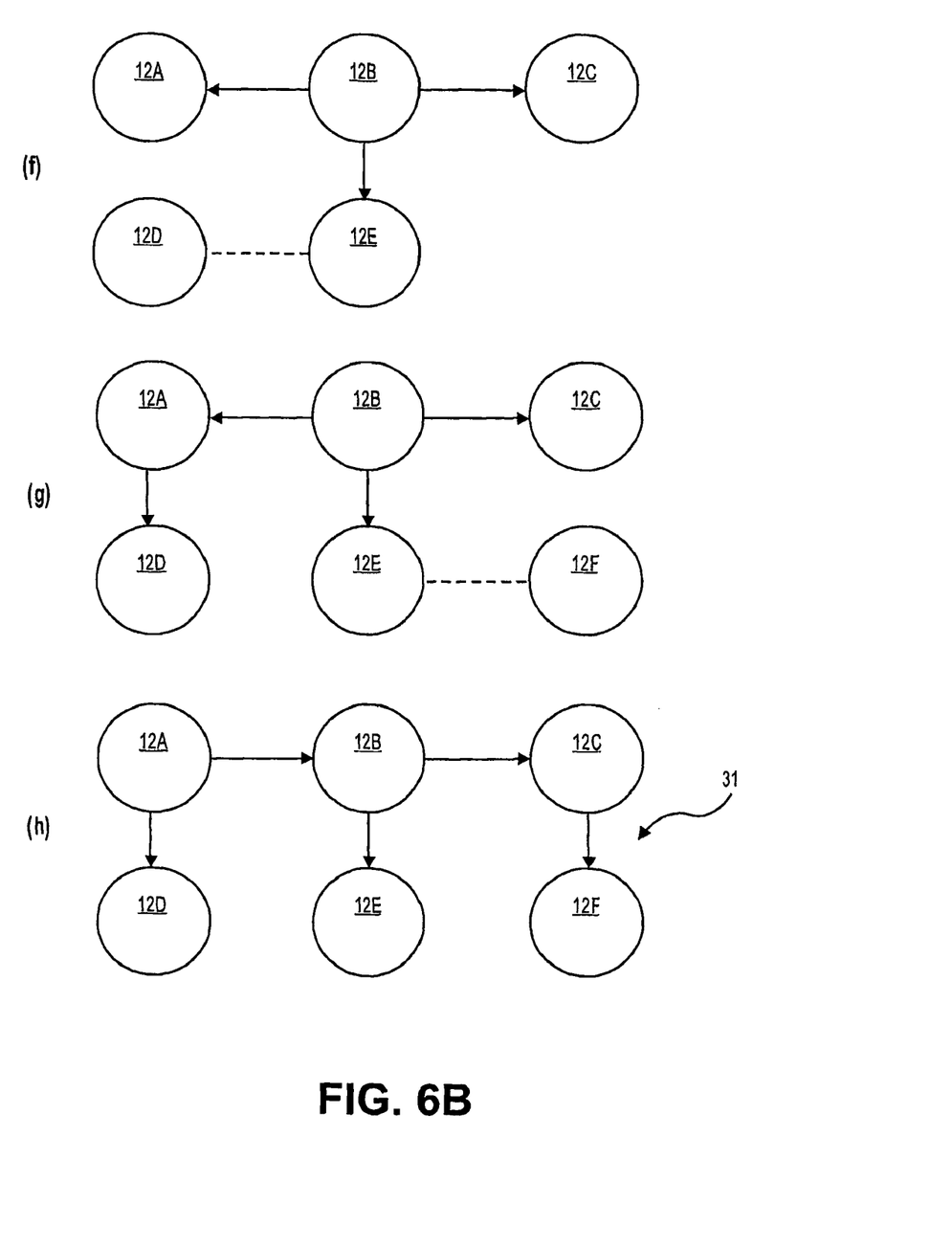

The decision of whether to reuse a spanning tree, or at least reuse some paths of the tree, is explained in the example illustrated in FIG. 6A and FIG. 6B. Referring also to FIG. 2 and FIG. 3, in one embodiment, tree generator 21 generates a first spanning tree (e.g., spanning tree 31 of FIG. 3) using a first processing node (e.g., processing node 12A) as the root and stores the tree in temporary data storage 23. Subsequently, in FIG. 6A(a), tree generator 21 generates another spanning tree (e.g., spanning tree 32 of FIG. 3) using a second processing node (e.g., processing node 12B) as the root. Before spanning tree 32 is assigned to processing node 12B, path determinator 25 compares every path of spanning tree 32 with the corresponding paths of the existing tree(s) in temporary data storage 23. Path determinator 25 constructs a second spanning tree that is to be assigned to processing node 12B by each time adding a node and a path from the root to that node until all of the processing nodes are added. Initially, in FIG. 6A(b), the root of spanning tree 32 (i.e., processing node 12B) is the only node in the second spanning tree.

In FIG. 6A(c), path determinator 25 selects a node (e.g., processing node 12A, 12C, or 12E) nearest the root of spanning tree 32. A node is nearest the root if the node has the minimal distance to the root. The minimal distance is measured by the weight of the path that leads to the root. As all the links in spanning trees 31 and 32 has substantially equal weights, the distance is determined by the number of hops it takes to reach the root. Assume that processing node 12A is selected. Path determinator 25 compares the path between processing nodes 12B and 12A in spanning tree 32 with the corresponding path in spanning tree 31. Path determinator 25 determines the paths in both trees 31, 32 are the same because both paths directly link processing node 12A to processing node 12B. Thus, path determinator 25 adds processing node 12A and the path between processing nodes 12B and 12A to the second spanning tree. Following the same process, in FIG. 6A(d) and FIG. 6A(e), path determinator 25 selects one of the remaining nodes (processing nodes 12C and 12E) that take one hop to reach the root. Path determinator 25 then adds processing nodes 12C and 12E, as well as the paths in spanning tree 32 from the root to these nodes, to the second spanning tree. Subsequently, in FIG. 6B(f), path determinator 25 selects another node (e.g., processing node 12D or 12F) in the remaining nodes that take two hops to reach the root. Assume that path determinator 25 selects processing node 12D. However, the direct path in spanning tree 32 between processing nodes 12D and 12E (indicated by a dotted line) does not exist in spanning tree 31. Thus, in FIG. 6B(g), path determinator 25 adds the existing path of spanning tree 31, instead of the corresponding path of spanning tree 32, to the second spanning tree. That is, path determinator 25 adds the path between processing nodes 12A and 12D in spanning tree 31 to the second spanning tree and disregards the path between processing nodes 12D and 12E in spanning tree 32. In FIG. 6B(h), processing node 12F is added in a similar manner to processing node 12D. In the end, the second spanning tree, illustrated in FIG. 6B(h), has the same structure as spanning tree 31. Thus, spanning tree 31 is reused for processing node 12B.

The process described in FIG. 6A and FIG. 6B ensures that the reused spanning tree provides the shortest paths between the subsequent processing node and each of its destinations. After the spanning trees are assigned, configuration unit 24 configures each input snoop port as either forwarding or terminating according to the message flowing from the root to its destinations in each of the trees. On a reconfiguration event, the spanning trees stored in temporary data storage 23 are cleared so that only the trees generated after the most recent reconfiguration event can be reused.

Figure 4A:
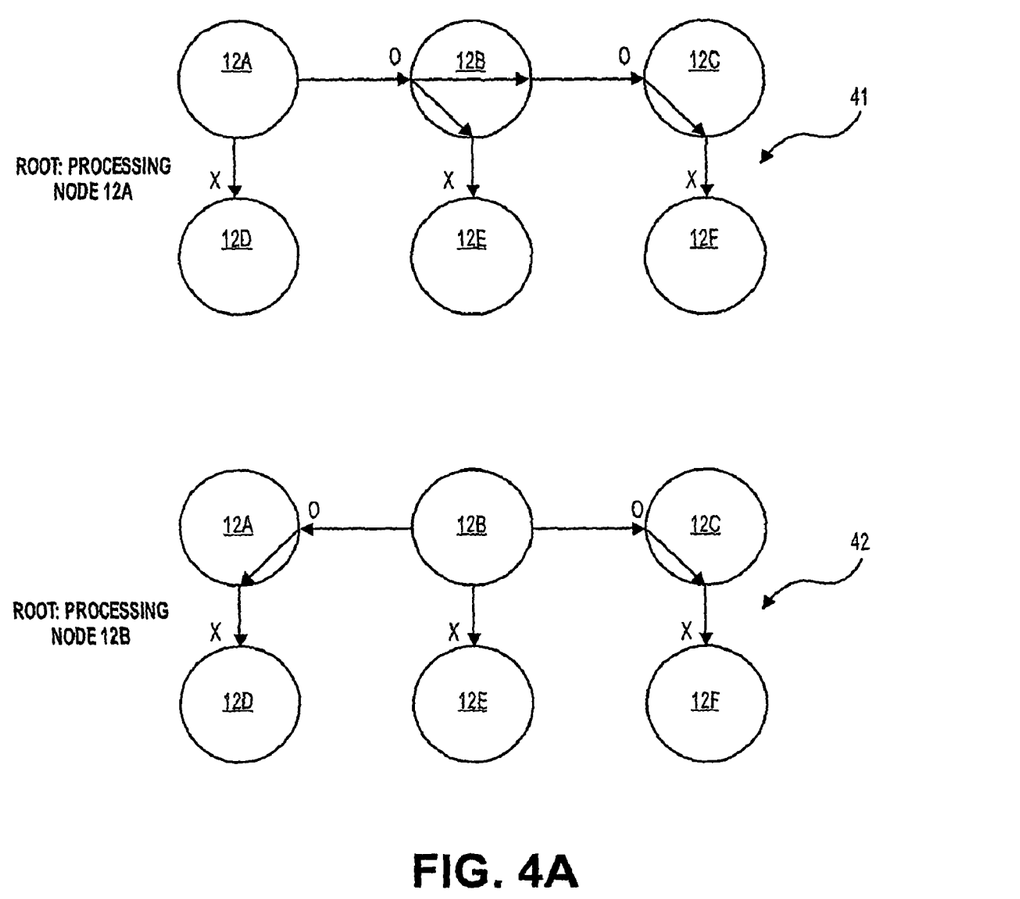
FIG. 4A and FIG. 4B show an example of spanning trees generated by the routing software of FIG. 2 for the processing nodes of FIG. 1.
Figure 4B:
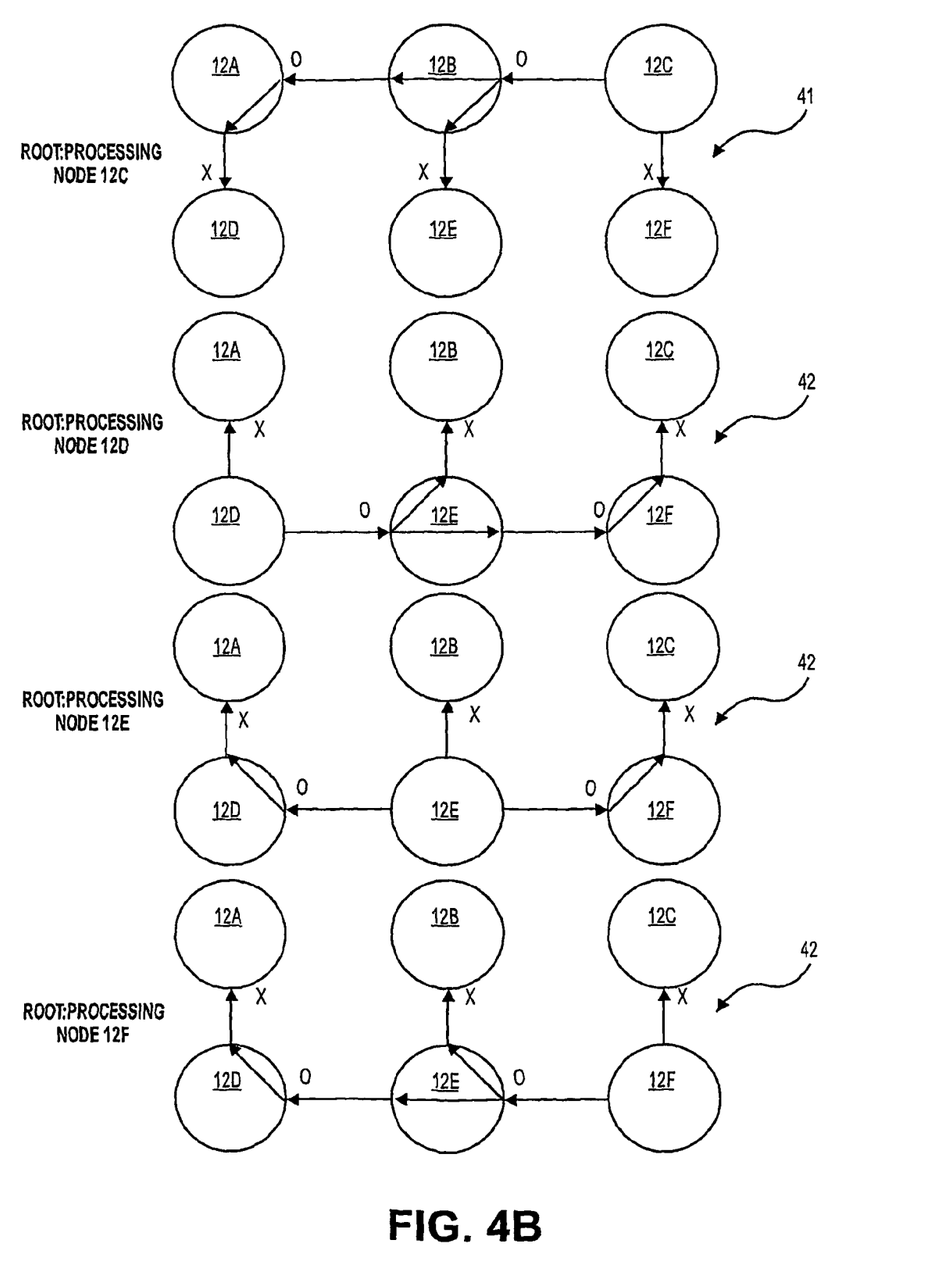

FIG. 4A shows an example of tree configurations for processing nodes 12A-12B and FIG. 4B shows an example of tree configurations for processing nodes 12C-12F. In this example, there are only two different tree configurations 41 and 42 for the six processing nodes 12A-12F. Tree configuration 41 provides the shortest paths for processing nodes 12A, 12B, and 12C, and tree configuration 42 provides the shortest paths for processing nodes 12D, 12E, and 12F. Moreover, tree configurations 41 and 42 are conflict-free configurations. As can be seen in FIG. 4A and FIG. 4B, a forwarding configuration of input snoop port is marked with an "o" next to the port, and a terminating configuration is marked with an "x" next to the port. Conflicts are eliminated as there is only one configuration for each input snoop port.

Figure 5:
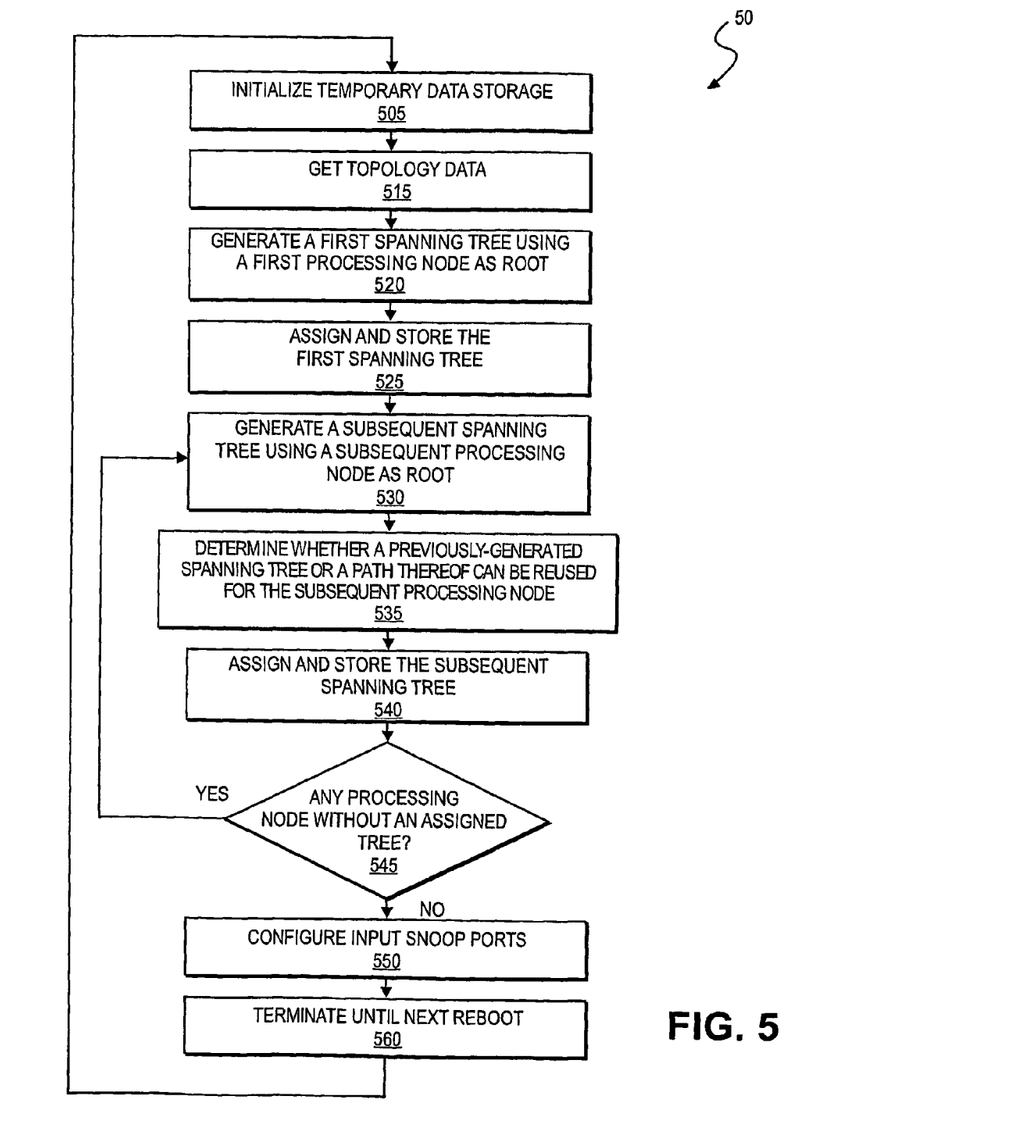
FIG. 5 is a flowchart showing an example of a process performed by the routing software of FIG. 2.

FIG. 5 is a flowchart 50 showing a process performed by routing software 20 of FIG. 2. At block 505, after a reconfiguration event, routing software 20 initializes temporary data storage 23 by clearing all the trees previously stored. At block 515, routing software 20 receives topology data for the network that interconnects the processing nodes (e.g., processing nodes 12A-12F of FIG. 1) in the system. The topology data indicates which processing nodes are directly connected to each other. At blocks 520, tree generator 21 generates a first spanning tree for a first processing node (e.g., processing nodes 12A). The first spanning tree is optimized for the first processing node such that the tree provides the shortest paths between the first processing node and each of the other processing nodes. At block 525, tree assigning unit 22 assigns the first spanning tree to the first processing node. The first spanning tree, including the topology and associated information, is stored in temporary data storage 23.

At block 530, routing software 20 continues to process the subsequent processing nodes. A subsequent processing node is defined as any processing node processed after the first processing node. Tree generator 21 generates a subsequent spanning tree using a subsequent processing node as the root. The subsequent spanning tree is optimized for the subsequent processing node such that the tree provides the shortest path between the root and each of its vertices. At block 535, routing software 20 determines whether previously-generated spanning tree(s), or some paths thereof, can be reused for the subsequent processing node. Path determinator 25 determines, a path at a time, whether a path in the previously-generated spanning trees can substitute for a path in the newly-generated tree. The process of path determinator 25 has been described in detail with reference to FIG. 6A and FIG. 6B. At block 540, the spanning tree constructed by path determinator 25 is assigned to the subsequent processing node and stored in temporary data storage 23.

At block 545, routing software 20 determines whether each processing node in the system has been assigned a spanning tree. If there is a processing node without an assigned tree, the process goes back to block 530. Otherwise, the process continues to block 550. At block 550, after all of the processing nodes are assigned respective spanning trees, configuration unit 24 configures each input snoop port of the processing nodes as either forwarding or terminating, according to the flow of messages in the assigned spanning trees. At block 560, routing software 20 terminates until the next reconfiguration event.

It is understood, however, the process of routing software 20 may be carried out in an order different from that described above. For example, the input snoop port may be configured immediately after each spanning tree is assigned. The assignment of the spanning trees may be performed after all of the processing nodes are processed. Moreover, in alternative embodiments, routing software 20 may determine whether a previously-generated spanning tree can be reused for a subsequent processing node before tree generator 21 generates a new spanning tree for the subsequent processing node. In this scenario, a previously-generated spanning tree is reused if path determinator 25 determines that the previously-generated spanning tree provides the shortest path between the subsequent processing node and each of the other processing nodes. Thus, tree generator 21 generates a spanning tree for the subsequent processing node if no previously-generated spanning tree exists that provides the shortest path between the subsequent processing node and each of the other processing nodes.

In the foregoing specification, specific embodiments have been described. It will, however, be evident that various modifications and changes can be made thereto without departing from the broader spirit and scope of the appended claims. The specification and drawings are, accordingly, to be regarded in an illustrative rather than a restrictive sense.

What is claimed is:

1. A method comprising:
    assigning a first spanning tree to a first node of a plurality of processing nodes that form a point-to-point network, the first node being a root of the first spanning tree, wherein the first spanning tree defines routes for the first node to send snoop messages to all of the other processing nodes in the network;
    assigning a subsequent spanning tree to a subsequent node of the processing nodes, the subsequent node being a root of the subsequent spanning tree, wherein the subsequent spanning tree defines routes for the subsequent node to send the snoop messages to all of the other processing nodes in the network, each of the first spanning tree and the subsequent spanning tree using direct links of the network as paths and all of the processing nodes as vertices;
    determining, a path in the subsequent spanning tree at a time, whether the path in the subsequent spanning tree can be replaced by a different path that exists in the first spanning tree, wherein the path in the subsequent spanning tree and the different path in the first spanning tree are on two different routes that connect the subsequent node to the same processing node in the network;
    for each particular processing node of the plurality of processing nodes, generating a spanning tree that uses the particular processing node as a root of the spanning tree and provides a shortest path between the root of the spanning tree and each of the vertices;
    wherein assigning the subsequent spanning tree, if a previously-generated spanning tree produces the shortest path between the subsequent node and each of the other processing nodes, assigning the previously-generated spanning tree to the subsequent node;
    configuring an input snoop port of each of the processing nodes as either terminating or forwarding; and
    routing the snoop messages in the first spanning tree and the subsequent spanning tree consistent with configuration of the input snoop port.

2. The method of claim 1 wherein generating a spanning tree comprises: comparing the generated spanning tree with a previously-generated spanning tree to determine whether a path in the previously-generated spanning tree may substitute for a corresponding path in the generated spanning tree.

3. The method of claim 2 wherein comparing the generated spanning tree comprises: storing the previously-generated spanning tree in a temporary data storage to be compared with the generated spanning tree.

4. The method of claim 1 wherein generating a spanning tree further comprises: generating a minimal spanning tree.

5. The method of claim 1 wherein configuring an input snoop port comprises:
configuring the input snoop port as forwarding to replicate and forward snoop messages that arrive at the input snoop port to different destinations.

6. An apparatus comprising:
a point-to-point network;
a plurality of processing nodes communicating via the point-to-point network, wherein
each of the processing nodes includes an input snoop port and an output snoop port to route snoop messages on the network, wherein at least one of the processing nodes includes:
a tree assigning unit to:
assign a first spanning tree to a first node of the processing nodes, the first node being a root of the first spanning tree, wherein the first spanning tree defines routes for the first node to send snoop messages to all of the other processing nodes in the network;
assign a subsequent spanning tree to a subsequent node of the processing nodes, the subsequent node being a root of the subsequent spanning tree, wherein the subsequent spanning tree defines routes for the subsequent node to send the snoop messages to all of the other processing nodes in the network, each of the first spanning tree and the subsequent spanning tree using direct links of the network as paths and all of the processing nodes as vertices;
determine, a path in the subsequent spanning tree at a time, whether the path in the subsequent spanning tree can be replaced by a different path that exists in the first spanning tree, wherein the path in the subsequent spanning tree and the different path in the first spanning tree are on two different routes that connect the subsequent node to a same processing node in the network;
a tree generator, for each particular processing node of the plurality of processing nodes, the tree generator to generate a spanning tree that uses the particular processing node as a root of the spanning tree and provides a shortest path between the root of the spanning tree and each of the vertices;
wherein assigning the subsequent spanning tree, if a previously-generated spanning tree produces the shortest path between the subsequent node and each of the other processing nodes, the tree assigning unit is to assign the previously-generated spanning tree to the subsequent node; and
a configuration unit to configure the input snoop port as either terminating or forwarding, wherein the snoop messages routed on the network are consistent with configuration of the input snoop port.

7. The apparatus of claim 6, wherein the tree assigning unit further comprises:
a path determinator to determine whether a path in a previously-generated spanning tree may substitute for a corresponding path in the subsequent spanning tree.

8. The apparatus of claim 6 further comprising: a tree generator to generate the subsequent spanning tree for the subsequent node if a previously-generated spanning tree does not provide a shortest path between the subsequent processing node and each of the other processing nodes.

9. The apparatus of claim 6 wherein the input snoop ports comprise: a fan-out mechanism that replicates and forwards the snoop messages that arrive at the input snoop port to different destinations.

10. A system, comprising:
a point-to-point network in a server;
a plurality of processing nodes communicating via the point-to-point network, wherein each of the processing nodes includes an input snoop port and output snoop port to route snoop messages on the network; wherein at least one of the processing nodes includes:
a tree assigning unit to:
assign a first spanning tree to a first node of the processing nodes, the first node being a root of the first spanning tree, wherein the first spanning tree defines routes for the first node to send snoop messages to all of the other processing nodes in the network;
assign a subsequent spanning tree to a subsequent node of the processing nodes, the subsequent node being a root of the subsequent spanning tree, wherein the subsequent spanning tree defines routes for the subsequent node to send the snoop messages to all of the other processing nodes in the network, each of the first spanning tree and the subsequent spanning tree using direct links of the network as paths and all of the processing nodes as vertices;
determine, a path in the subsequent spanning tree at a time, whether the path in the subsequent spanning tree can be replaced by a different path that exists in the first spanning tree, wherein the path in the subsequent spanning tree and the different path in the first spanning tree are on two different routes that connect the subsequent node to the same processing node in the network;
a tree generator, for each particular processing node of the plurality of processing nodes, the tree generator generating a spanning tree that uses the particular processing node as a root of the spanning tree and provides a shortest path between the root of the spanning tree and each of the vertices;
wherein assigning the subsequent spanning tree, if a previously-generated spanning tree produces the shortest path between the subsequent node and each of the other processing nodes, the tree assigning unit is to assign the previously-generated spanning tree to the subsequent node;
a configuration unit to configure the input snoop port as either terminating or forwarding, wherein the snoop messages routed on the network are consistent with configuration of the input snoop port; and
I/O devices comprising a wireless transmitter and a wireless receiver, the I/O devices communicating with the plurality of processing nodes via the point-to-point network.

11. The system of claim 10, wherein tree assigning unit further comprises: a path determinator to determine whether a path in a previously-generated spanning tree may substitute for a corresponding path in the subsequent spanning tree.

12. A non-transitory machine-readable medium having instructions therein which when executed cause a machine to:
assign a first spanning tree to a first node of a plurality of processing nodes that form a point-to-point network, the first node being a root of the first spanning tree, wherein the first spanning tree defines routes for the first node to send snoop messages to all of the other processing nodes in the network;

assign a subsequent spanning tree to a subsequent node of the processing nodes, the subsequent node being a root of the subsequent spanning tree, wherein the subsequent spanning tree defines routes for the subsequent node to send the snoop messages to all of the other processing nodes in the network, each of the first spanning tree and the subsequent spanning tree using direct links of the network as paths and all of the processing nodes as vertices;

determine, a path in the subsequent spanning tree at a time, whether the path in the subsequent spanning tree can be replaced by a different path that exists in the first spanning tree, wherein the path in the subsequent spanning tree and the different path in the first spanning tree are on two different routes that connect the subsequent node to the same processing node in the network;

for each particular processing node of the plurality of processing nodes, generate a spanning tree that uses the particular processing node as a root of the spanning tree and provides a shortest path between the root of the spanning tree and each of the vertices;

wherein assigning the subsequent spanning tree, if a previously-generated spanning tree produces the shortest path between the subsequent node and each of the other processing nodes, assign the previously-generated spanning tree to the subsequent node;

configure an input snoop port of each of the processing nodes as either terminating or forwarding; and route the snoop messages in the first spanning tree and the subsequent spanning tree consistent with configuration of the input snoop port.

13. The non-transitory machine-readable medium of claim 12 wherein generating a spanning tree further comprises instructions operable to: compare the generated spanning tree with a previously-generated spanning tree to determine whether a path in the previously-generated spanning tree may substitute for a corresponding path in the generated spanning tree.

14. The non-transitory machine-readable medium of claim 12 wherein configuring an input snoop port further comprises instructions operable to: configure the input snoop port as forwarding to replicate and forward the snoop messages that arrive at the input snoop port to different destinations.

* * * * *